April 10, 1956 J. M. LAFFERTY 2,741,720

COLOR TELEVISION APPARATUS AND METHODS

Filed Feb. 1, 1951 3 Sheets--Sheet 1

Inventor
James M. Lafferty
by Paul A. Frank
His Attorney

April 10, 1956 J. M. LAFFERTY 2,741,720

COLOR TELEVISION APPARATUS AND METHODS

Filed Feb. 1, 1951 3 Sheets-Sheet 2

Inventor:
James M. Lafferty,
by Paul A. Frank
His Attorney.

April 10, 1956 J. M. LAFFERTY 2,741,720

COLOR TELEVISION APPARATUS AND METHODS

Filed Feb. 1, 1951 3 Sheets--Sheet 3

Inventor:
James M. Lafferty,
by Paul A. Frank
His Attorney.

United States Patent Office 2,741,720

Patented Apr. 10, 1956

2,741,720

COLOR TELEVISION APPARATUS AND METHODS

James M. Lafferty, Schenectady, N. Y., assignor to General Electric Company, a corporation of New York Application February 1, 1951, Serial No. 208,875

5 Claims. (Cl. 315—13)

Figure 1:
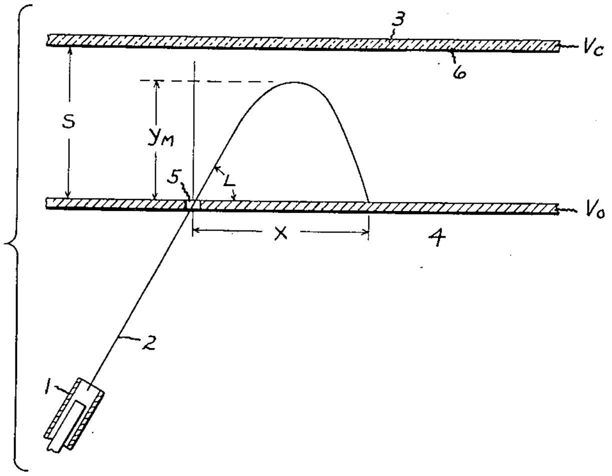

My invention relates to color television receivers and has for its primary object to provide new and improved methods and apparatus for producing color television pictures.

In an attempt to provide a satisfactory color television receiver, numerous arrangements of phosphors in a cathode-ray tube and varying structures for exciting such phosphors have been proposed. According to one arrangement, different color-producing phosphors are arranged in super-imposed layers and an electron beam is impinged on the layers, the intensity of the beam being modulated in accordance with the phosphor desired to be excited or fluoresced by the electrons of the beam. In such a system, the potentials required to obtain satisfactory penetration of the superimposed layers vary considerably in magnitude with the color to be produced, requiring an elaborate arrangement of voltage supply and control equipment.

In other arrangements, the different color-producing phosphors are arranged either in adjacent strips or symmetrically arranged spots and either a separate electron beam is provided for each color phosphor and a different one of the beams is used in accordance with the phosphor to be excited or a single electron beam is utilized and the beam is deflected selectively to energize a desired phosphor to reproduce the desired color television picture. In such a system a number of problems are encountered which render it difficult to obtain the desired degree of color definition in the resultant picture.

It is an object of my invention to provide new and improved methods for producing color television pictures which does not require accurate control of the thickness of the layers of phosphors employed.

Still another object of my invention is to provide a new and improved color television receiver in which the amount of power required for operation is minimized. Still another object of my invention is to provide new and improved methods of producing color television pictures which may be employed with cathode-ray tubes having either a single electron gun or a multiple electron gun structure.

In one of its aspects my improved methods of producing color television pictures include the steps of passing the stream of electrons through apertures in a phosphor-bearing screen, reversing the stream of electrons after they have passed through the screen and controlling the travel of the reversed electrons in accordance with received signals selectively to excite desired ones of different color-producing phosphors on the screen.

In accordance with one embodiment of the present invention, a cathode-ray tube, having a transparent electrically conductive end wall and a perforate electrode position in spaced relation with the end wall, has different color-producing phosphors supported on the surface of the electrode adjacent the end wall. The phosphor-bearing electrode is maintained at a positive potential with respect to the end wall so that electrons projected through the perforations in the electrode are reversed in their travel and ultimately strike the phosphors. The path of electrons in the region between the electrode and the end wall is controlled either by the angle of incidence of the electrons as they enter the region, the potential difference between the end wall and the electrode, or the velocity of the incident beam selectively to energize the desired one of the different color-producing phosphors.

Figure 2:
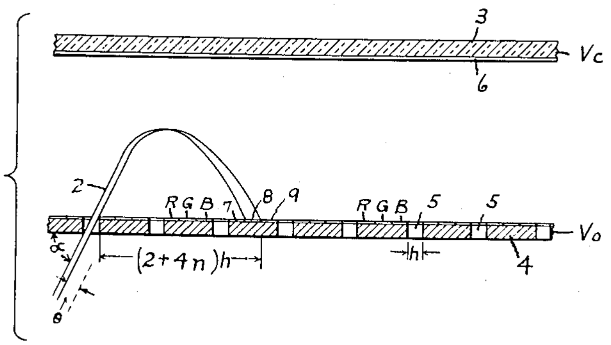
Figure 3:
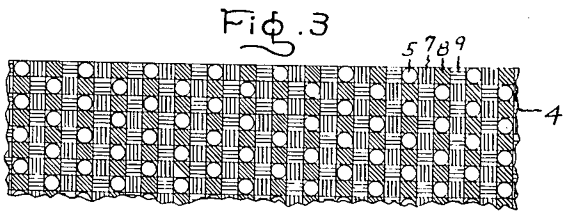
Figures 7, 8, 9:
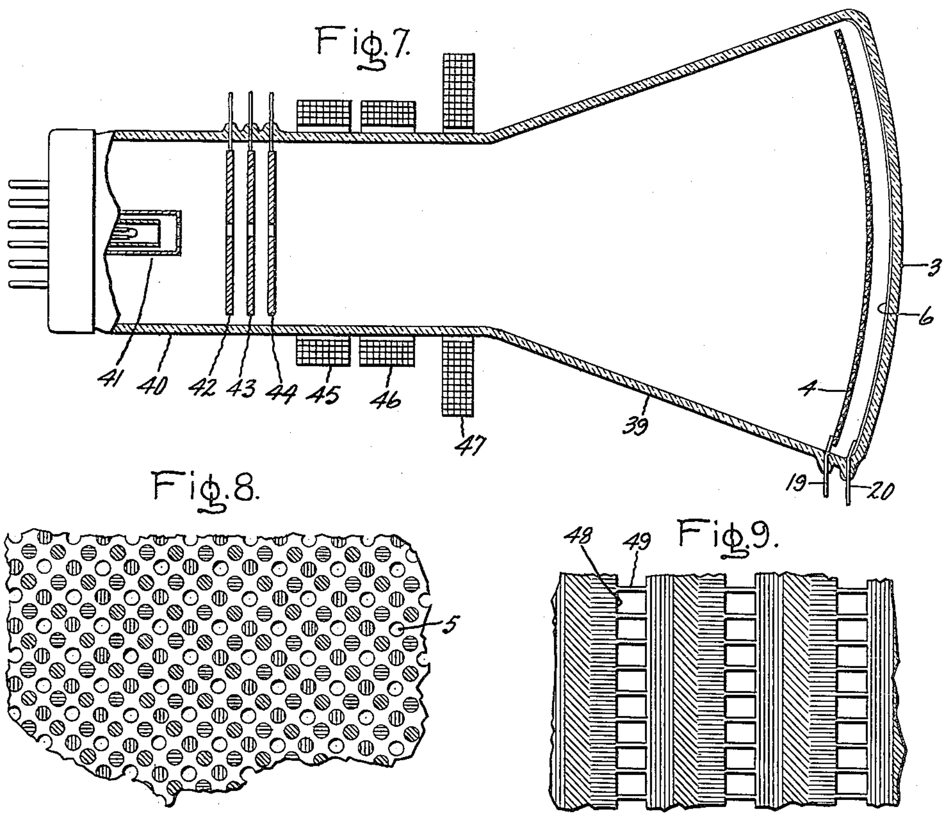

The features of my invention which I believe are novel are set forth with particularity in the appended claims. My invention, itself, however, together with further objects and advantages thereof may best be understood by reference to the following description taken in connection with the accompanying drawing in which Figs. 1 and 2 represent portions of a cathode-ray tube and illustrate certain of the operational characteristics of a tube in accordance with my invention, Fig. 3 illustrates one arrangement of phosphors, Figs. 4–7 show in schematic form different cathode-ray tubes embodying my invention, Figs. 8 and 9 illustrate other arrangements of phosphors which may be employed in cathode-ray tubes of the type shown in Figs. 4–7, Fig. 10 illustrates a portion of a reflector electrode circuit employed in connection with the tubes of this invention and Fig. 11 is a curve illustrating operational characteristics of the circuit of Fig. 10.

Referring to the drawing in Fig. 1, I have shown certain components of a cathode-ray tube including an electron gun 1 arranged to project or direct a beam of electrons 2 toward a transparent end wall 3 of a cathode-ray tube. Positioned between the electron gun 1 and the end wall 3 is a metal plate 4 arranged parallel to end wall 3, and having aperture 5 through which the electron beam 2 passes. The end wall 3 moreover, is provided on its internal surface with a conductive coating 6.

In the foregoing arrangement, in accordance with my invention, the cathode of the electron gun 1 is maintained at ground or zero potential, the metal plate 4 at a potential $V_0$ positive with respect to the cathode, and the conductive end wall 3 is maintained at a potential $V_c$ intermediate the potential of the cathode and the plate 4. With this arrangement there is produced between the end wall 3 and the plate 4 a uniform field $$F=\frac{(V_0-V_c)}{S} \qquad (1)$$

where S is the distance between end wall 3 and the plate 4, this uniform field being a retarding field for an electron beam. If the retarding field F is sufficiently strong, the electron beam in its travel in the region between the end wall 3 and the plate 4 is reflected and strikes the plate 4 as illustrated at a point which is displaced from the aperture 5 by a distance $x$. It can be shown that the equation of the trajectory of the electron beam in the region is $$y=-\frac{1}{4}\frac{F}{V_0}\frac{x^2}{\cos^2_\alpha}+x\tan\alpha \qquad (2)$$

The maximum distance electron beam 2 penetrates into this retarding field is $$y_m=\frac{V_0S}{V_0-V_c}\sin^2\alpha \qquad (3)$$

If the conductive end wall 3 is considered as a reflector, the reflector voltage $V_c$ must always be less than $V_0\cos^2_\alpha$ in order to prevent electron beam 2 from striking the end wall.

The distance $x$ between the point at which the beam enters the retarding field, that is the aperture 5, and the point where it strikes the plate 4 is $$x=\frac{2V_0S}{V_0-V_c}\sin 2\alpha \qquad (4)$$

From the foregoing equation it is apparent that $x$ may be made to vary by changing the angle of incidence which the beam makes with plate 4 on entering the retarding field, by changing the magnitude of the retarding field by changing either the voltage $V_c$ or the voltage $V_0$, or by changing the velocity of the incident beam by varying $V_0$.

Equation 4 demonstrates, likewise, that if the ratio of $$\frac{V_0}{V_c}$$

is maintained constant, the distance $x$ remains constant. It is thus apparent that a system operated in accordance with the illustration of Fig. 1 does not require a closely regulated source of unidirectional voltage supply, provided the ratio of $$\frac{V_0}{V_c}$$

remains constant.

Fig. 2 illustrates the manner in which the principles illustrated in Fig. 1 may be applied to provide a color television tube, Fig. 2 showing a portion of such a tube. The glass face, or end wall 3, is coated with a transparent conductive film 6, such as tin chloride, or, alternatively, it may be covered with a fine metal mesh having a very open structure. This conducting surface is operated at the reflector potential $V_c$. The electrode 4 is illustrated as being perforated, containing a large number of holes or apertures 5, each having a diameter $h$. Between adjacent holes different color-producing phosphors, illustrated as red, green, and blue phosphors 7, 8, 9, are painted or otherwise applied in the order shown. By adjustment of the reflector voltage $V_c$, the electron beam 2, after entering into the region between the end wall 3 and the electrode 4, may be made to strike, for example, the green phosphor dot at a distance $(2+4n)h$ from the aperture where the beam entered. The number of apertures or holes between the point where the beam enters the region and the point where it strikes the electrode 4 is $n$ in the foregoing equation. To excite the red phosphor 7, the value of $V_c$ may be decreased slightly. Alternatively, to excite the blue phosphor 9, the value of $V_c$ may be increased slightly. Thus, by varying the reflector voltage $V_c$ the different color-producing phosphors may be excited as desired. The distance which the reflected beam has to move to produce all three colors is $2h$. It can be shown, therefore, that if $n$ is large, the amount which the reflector voltage $V_c$ must be varied to move the beam 2 a distance of $2h$ is $$v_c=\frac{(V_0-V_c)}{1+2n} \qquad (5)$$

In the foregoing equation $V_c$ is the fixed bias on the reflector or end wall 3 and $v_c$ is the amount the reflector voltage is varied about this fixed value.

The distance S between the end wall 3 and the phosphor-bearing electrode 4 in terms of the other parameters of the tube is $$S=\frac{(1+2n)h(V_0-V_c)}{V_0 \sin 2\alpha} \qquad (6)$$

The capacitance between the reflector, or end wall 3, and the phosphor-bearing electrode is $$C=.176\frac{D^2V_0 \sin 2\alpha}{(V_0-V_c)(1+2n)h}\ \mu\mu\ \text{fd.} \qquad (7)$$

where D is the diameter of the end wall, or tube face 3, and $h$ is the diameter of the hole in electrode 4, both expressed in inches.

It can be seen from Equations 5 and 7 that there is an advantage in operating the cathode-ray tube illustrated in Fig. 2 in a mode in which $n$ is large. Such a construction reduces the value of signal voltage required and at the same time increases the spacing S so that the capacitance C is reduced. Both of these factors reduce the power required to operate a color television tube of this construction. In a tube construction embodying the principles illustrated in Fig. 1, a value of $n=40$, giving a displacement of $x$ of one inch, was found to give satisfactory results.

It can also be seen from Equations 6 and 7 that as the angle $\alpha$ approaches 90°, the value of S increases rapidly and the capacitance is reduced. There are operational limits, however, in increasing the value of $\alpha$, since as $\alpha$ approaches 90° the velocity of the beam decreases at the top of its trajectory. If the velocity at this point becomes too low the beam expands due to the space charge within itself and a sharply focused spot cannot be obtained on the screen.

As stated previously, the different phosphors may alternatively be excited by maintaining the reflector voltage $V_c$ constant and varying the angle of incidence $\alpha$. In operating the tube in this manner, the angle $\theta$ in radians through which the angle $\alpha$ must be varied to move the beam a distance $2h$ is $$\theta=\frac{\tan 2\alpha}{2(1+2n)} \qquad (8)$$

The value of S given in Equation 6 applies to this mode of operation also. Here again, it is seen that the deflection sensitivity is increased by making the value of $n$ as large as possible and maintaining $\alpha$ as close to 90° as possible.

In Fig. 3 there is shown one possible arrangement of the apertures 5 and the phosphors 7, 8, 9 on the phosphor-bearing electrode 4, although other possible well-known variations of phosphor arrangements may be employed. Although the screen and face plate 3 are both illustrated as flat surfaces in Figs. 1 and 2, both of these surfaces may be curved.

Figures 4, 5, 6:
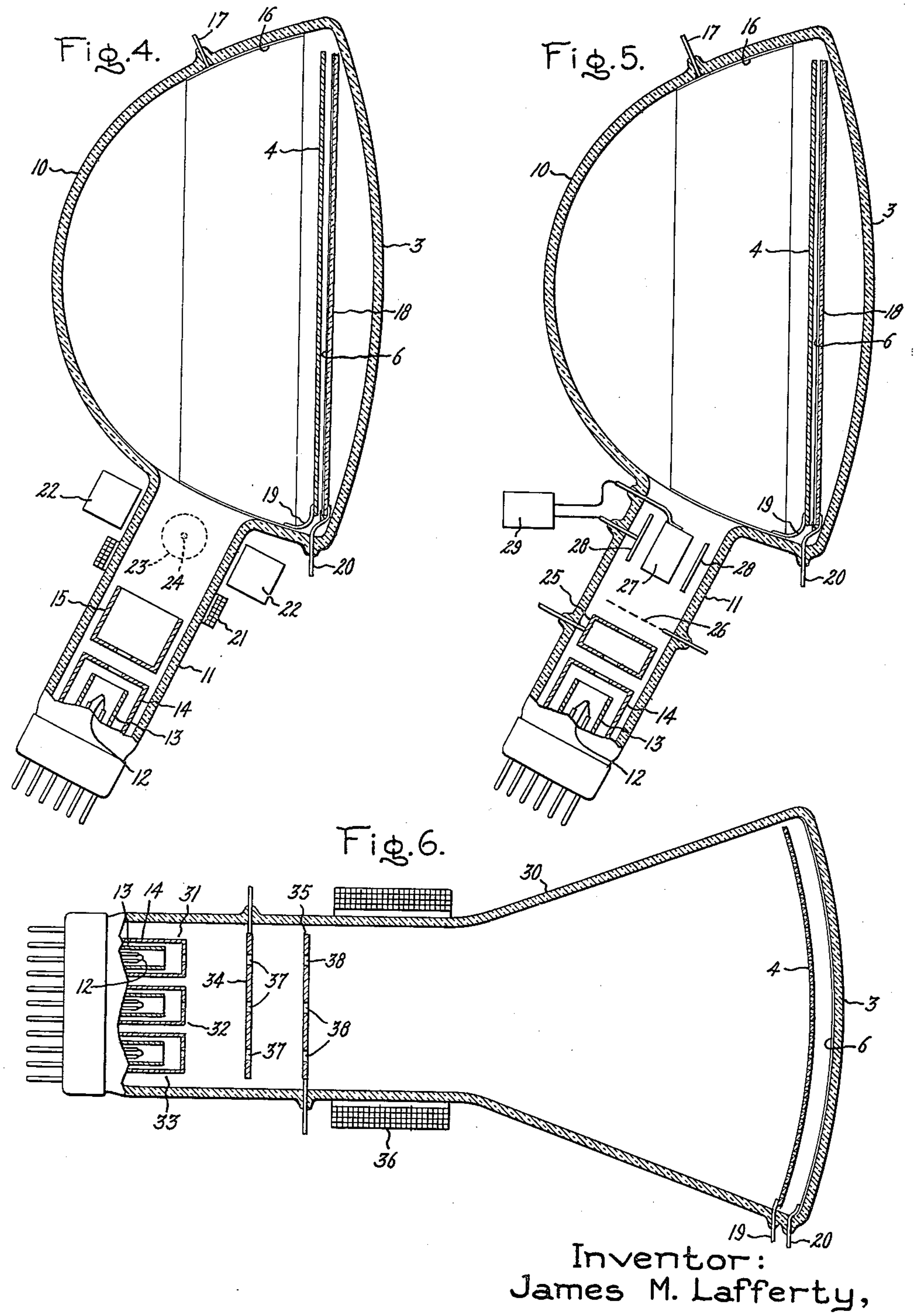

In Fig. 4 there is shown one embodiment of a cathode-ray tube constructed in accordance with the principles of my invention and comprising an envelope 10 having a transparent end wall 3 and a neck portion 11 disposed at an angle with respect to the end wall. Located within the neck portion 11 is an electron gun comprising a heater 12, a cathode 13, a control electrode 14 and a first, or accelerator, anode 15. The usual second anode of the cathode-ray tube may comprise a conductive coating 16 along the inner wall of the enlarged portion of the tube, a connection to the coating being made through an external connection 17. Alternatively, the member 16 may comprise a metallic envelope portion. The phosphor-bearing electrode 4 is positioned in front of the end wall 3 and supports a reflector electrode 18 which functions similar to the conductive coating 6 illustrated in Figs. 1 and 2. Connection is made to the phosphor-bearing electrode 4 for supplying operating potential thereto by means of a conductor 19 connected to an external voltage source or alternatively, as illustrated, connected to the metallic envelope portion 16. Similarly operating potentials are supplied to the reflector electrode 18 by means of a conductor 20. Positioned between the accelerating anode 15 and the electrode 4 may be the usual focus coil 21, and, in the case of a cathode-ray tube of the electromagnetic type, horizontal and vertical deflection coils 22, 23.

In operating a tube of the type illustrated in Fig. 4, it may be desirable in order to eliminate a distortion, known as "keystone distortion," to compensate the current supplied to deflection coils 22, 23. It may also be found desirable to compensate for the displacement of the beam at the different ends of the tube caused by the difference in the angle of incidence as the beam, starting from an apparent origin 24, is swept back and forth, as well as vertically, across the tube in the manner conventional in operating a cathode-ray tube for the reception of television signals. This compensation may be achieved by varying the spacing of the holes and phosphors at different points of electrode 4. Alternatively, the compensation may be effected by varying the distance between phosphor-bearing electrode 4 and reflecting electrode 18. This latter method of providing compensation is illustrated in Fig. 4 by the increase in spacing between electrodes 4 and 18 at the top portion of the tube as illustrated. A similar increase in spacing would be necessary at the outer edges of the tube. Compensation by this latter method requires that electrode 18 be curved in two dimensions relative to electrode 4.

In Fig. 5 there is illustrated an electrostatic deflection type of cathode-ray tube embodying my invention. In this tube there is positioned within neck 11 a focusing anode 25 and a second, or high voltage anode 26, which anodes exert their influence upon the electron beam prior to the entrance of that beam into the region of the horizontal and vertical deflecting plates 27, 28. In the tube of Fig. 5, the reflecting electrode 18 is illustrated as being uniformly spaced from the phosphor-bearing electrode 4. In this instance, the compensation for the "keystone distortion" mentioned in connection with the discussion of the tube of Fig. 4 is obtained by means of suitable external compensating circuits 29. Compensation for the displacement of the beam at the edges of the tube due to the difference in the angle of incidence of the electron beam may be achieved by the first of the methods likewise discussed in connection with Fig. 4, namely, varying the spacing of the holes and phosphors on electrode 4, or, alternatively, by controlling the voltage supply to reflector electrode 18 so that the value of the reflector electrode voltage changes with the position of the beam in its scanning cycle.

In operating cathode-ray tubes of the type illustrated in Figs. 4 and 5 to reproduce a color television picture, the video component of a received television signal is supplied to control electrode 14 of the tube to modulate the electron beam in accordance with a received picture signal. The synchronizing components of the received television signals are supplied to the beam deflection systems, in the case of Fig. 4 to the horizontal and vertical deflecting coils 22, 23, and in the case of the tube of Fig. 5 to the horizontal and vertical deflection plates 27, 28. At the same time, color synchronizing signals are supplied to the reflecting electrode 18 or alternatively to electrode 4. Thus, as the electron beam is swept back and forth across electrode 4, it penetrates the apertures in that electrode and is reversed through the operation of the retarding field between electrodes 4, 18. At the same time, the potential difference between electrodes 4 and 18 is varied in accordance with the color synchronizing signals so that the reversed electrons strike the proper phosphor on the surface of electrode 4 facing the end wall 3. Either tube may thus be used to reproduce a color television picture from a received color television signal which supplies, in addition to the video signal and usual line and frame synchronizing signals, a color synchronizing signal. Thus, these tubes may be used in a dot sequential, a line sequential, a frame sequential, or a simultaneous color television system. In a television system in which information for all colors is supplied simultaneously to tubes employing the principles of this invention it is necessary to change the simultaneous color information to color synchronizing signals which can be employed sequentially to operate the tube. In such a system the converted sequential color information signals may be employed to control the intensity of the beam while it is on the different phosphors to reproduce the desired color picture, or, alternatively, to control the time of excitation of each color phosphor.

In Fig. 6 there is shown a cathode-ray tube embodying my invention and in which the angle of incidence of the electron beam upon a perforate phosphor-bearing electrode is controlled to reproduce a color television signal. The tube illustrated in Fig. 6 comprises an envelope 30 having an end wall 3 and employing three electron guns 31, 32, 33, each of which comprises a heater 12, a cathode 13, and a control electrode 14. Positioned between the control electrodes and the end wall 3 are a focusing anode 34, a high voltage anode 35, and a perforated phosphor-bearing electrode 4. The inner surfaces of the end wall 3 may be coated with a transparent conductive film 6 or covered with a transparent fine metal mesh. Surrounding the neck of the cathode-ray tube is a deflection yoke 36 which comprises horizontal and vertical deflection coils for scanning the electron beam across the surface of electrode 4. Both anodes 34 and 35 contain respective apertures 37, 38 aligned with the apertures in the control electrodes 14 of the guns 31—33.

In the operation of the tube of Fig. 6 the different color components of a received television signal are separated in conventional circuits (not shown) and the individual color components are supplied to a respective one of the control electrodes of the guns 31—33. Thus, for example, the red component may be supplied to the control electrode of gun 31, the green component may be supplied to the control electrode of gun 32, and the blue component may be supplied to the control electrode of gun 33. Depending upon the type of received signal, these components may be supplied either simultaneously or sequentially. In either event, a uniform retarding field is established between phosphor-bearing electrode 4 and the reflecting surface 6 by supplying proper unidirectional potentials to these elements by means of conductors 19, 20. If a phosphor pattern similar to that shown in Fig. 3 is employed on the electrode 4, preferably, the guns 31—33 are aligned horizontally of the tube.

In Fig. 7 there is shown a modified form of cathode-ray tube structure embodying the principles of my invention and which employs a varying angle of incidence on a phosphor-bearing electrode to control the excitation of the different colored phosphors. In this embodiment the cathode-ray tube comprises an envelope 39 having a neck portion 40 and an end wall 3 coated with a conductive covering 6. Positioned in front of the wall 3 is a perforated phosphor-bearing electrode 4 of the type previously described. The electron beam producing portion of the tube comprises a cathode 41, a control electrode 42, and first and second anodes 43, 44. Positioned adjacent the second anode 44 is a deflection coil 45 to which is supplied pulses of current arranged to so rotate the electron beam that its angle of incidence with the phosphor-bearing electrode 4 varies in accordance with the color to be produced. After the electron beam has been rotated so that its angle of incidence corresponds to the color to be produced, it passes through the usual focusing coil 46 and deflection yoke 47. Unidirectional potentials are supplied over conductors 19, 20 to electrode 4 and the conducting surface 6 to establish a uniform retarding field in the region between electrode 4 and the end wall.

In the operation of a tube of the type illustrated in Fig. 7, the angle $\alpha$ of Fig. 2 is varied through an angle $\theta$ in accordance with the color phosphor to be excited, the angle of variation, $\theta$, being obtained through the operation of coil 45 to rotate the beam in synchronism with the color signals of a received television signal. The end wall 3 and electrode 4 are similarly curved and a uniform retarding field may be established therebetween. The angle of incidence of the electron beam may be varied in accordance with color signals of any type of a received television signal whether it be a dot sequential, line sequential, or frame sequential color television signal. The electron beam is rotated in accordance with the type of signal received so that the angle of incidence at each particular moment corresponds to the received color information.

In Fig. 8 there is illustrated a portion of one type of phosphor which may be used in conjunction with tubes employing the varying angle of incidence theory of operation. In such an arrangement of phosphors, a plurality of apertures 5 are provided in a phosphor-bearing electrode and the various blue, green, and red phosphors or other color-producing phosphors are arranged symmetrically with respect to the apertures 5 so that merely by varying the angle of incidence of an electron beam upon the electrode, a desired color phosphor may be excited. This assumes, of course, that a uniform retarding field is established between such a phosphor-bearing electrode and a reflecting electrode.

Fig. 9 illustrates another possible arrangement of phosphors on electrode 4. In this arrangement the different color-producing phosphors are arranged in adjacent strips either horizontally or vertically of the electrode and the apertures are positioned between succeeding groups of strips. Preferably, the electrode is formed of a metal and the apertures are obtained by etching, cutting, or stamping rectangular openings 48 leaving a thin bridging piece of metal 49 between adjacent apertures. In the different phosphor arrangements illustrated in Figs. 3, 8, and 9 the different color-producing phosphors, of course, are arranged in recurring patterns symmetrically positioned relative to the perforations in the phosphor-bearing electrode.

Figure 10:
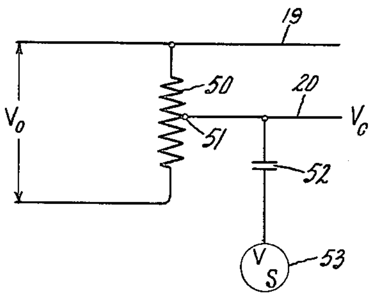
Figure 11:
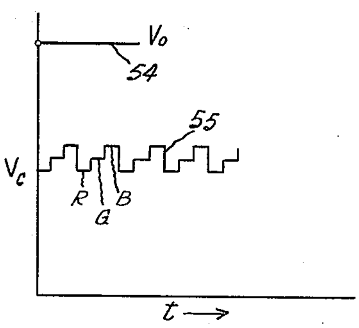

In Fig. 10 there is shown a portion of a circuit for supplying potentials to the phosphor-bearing and reflector electrodes which obviates the requirement of a regulated unidirectional voltage supply. In this circuit the unidirectional voltage $V_0$ which may be the unidirectional voltage supply to the conductive coating 16 of the tube of Fig. 4, or, alternatively, to the metallic envelope portion of a well-known type of cathode-ray tube envelope, is connected to the phosphor-bearing electrode 4. The voltage $V_0$ likewise is impressed across a voltage dividing resistor 50 having a tap point 51 to which is connected conductor 20. Likewise, connected to conductor 20 through a capacitor 52 is a source 53 of color-synchronizing voltage. In operation, as the voltage of the source $V_0$ varies, the ratio of the unidirectional voltage $$\frac{V_0}{V_c}$$

remains constant so that the distance $x$ through which the electron beam is deflected depends only on the ratio of the voltage of the unidirectional voltage source $V_0$ and the reflector voltage $V_c$, which ratio remains constant in the circuit shown.

Fig. 11 illustrates a typical wave of voltage supplied to a typical set of phosphor-bearing and deflecting electrodes. The curve 54 illustrates the constant unidirectional voltage which is supplied to the phosphor-bearing electrode, whereas the stepped curve 55 illustrates the voltage supplied to the reflecting electrode. In order to obtain satisfactory operation, the variation of the voltage $V_c$ by color synchronization signals for excitation of the different phosphors may be a very small percentage of the total voltage impressed upon the reflector electrode. Preferably, the minimum potential of the reflector electrode is a value intermediate the potential of the phosphor-bearing electrode and ground.

One of the principal advantages of my improved color television apparatus is that it reduces the magnitude of the potentials required for exciting phosphors to produce different colors. By causing the electrons to impinge directly on the surface of the phosphor facing the viewer, a minimum amount of energy is required to excite or fluoresce the phosphors. At the same time, a brighter picture is produced. Likewise, due to the fact that each individual phosphor dot is excited, more accurate color reproduction is obtained, there being no merging of colors due to excitation of adjacent phosphors which occurs with phosphors placed in layers upon a viewing screen.

Another advantage of the methods of producing color television and the apparatus depicted is that they must be used in cathode-ray tubes of either the single electron gun or the three-gun type.

While my invention has been described by showing a particular embodiment thereof, it will be understood that numerous modifications may be made by those skilled in the art without departing from the invention. I, therefore, aim in the appended claims to cover all such modifications and variations as come within the true spirit and scope of my invention.

What I claim as new and desire to secure by Letters Patent of the United States is:

1. In a color television receiver, a cathode-ray tube having a transparent end wall having a conductive inner surface, an electron gun supported within said tube for directing an electron beam toward said wall, an electrode positioned between said gun and said wall, said electrode having closely spaced perforations and having different color-producing phosphors supported on the side thereof adjacent said wall, said phosphors being arranged in recurring patterns symmetric relative to said perforations, means for maintaining said electrode at a positive potential relative to said wall whereby electrons after passing through said electrode are reversed in direction to strike said side, and means for controlling the angle at which electrons pass through said perforations to control the path of electrons between said wall and electrode selectively to excite said different color-producing phosphors.

2. In a color television receiver, a cathode-ray tube having a transparent end wall, an electron gun supported within said tube for directing an electron beam toward said wall, an electrode positionsd between said gun and said wall, said electrode having closely spaced perforations therein and having different color-producing phosphors supported on the side thereof adjacent said wall, said phosphors being arranged in recurring patterns symmetric relative to said perforations, said electrode being maintained at a positive potential relative to said end wall whereby electrons after passing through said electrode are deflected in direction to strike said side, and means for controlling the path of electrons between said gun and said electrode to control the angle at which electrons traverse said perforations and the path of electrons between said wall and said electrode selectively to excite said different color-producing phosphors.

3. In a color television receiver, a cathode-ray tube having a transparent end wall, a plurality of electron guns supported within said tube for directing a plurality of electron beams toward said wall, an electrode positioned between said guns and said wall, said electrode having closely spaced perforations therein and having different color-producing phosphors supported on the side thereof adjacent said wall, said phosphors being arranged in recurring patterns symmetric relative to said perforations, means for maintaining said electrode at a positive potential relative to said wall whereby electrons after passing through said electrode may be deflected in direction to strike said side, electrons from different of said guns entering said perforations at different angles to excite different of said phosphors.

4. The method of producing a color television picture which comprises passing a stream of electrons through a mesh of different color-producing phosphors, reversing the path of the electrons to cause them to strike the phosphors, and controlling the angle of incidence between the mesh and the electrons prior to their reversal selectively to excite the phosphors.

5. In a color television receiver, a cathode-ray tube having a transparent end wall, a perforated electrode positioned adjacent said end wall, and having different color-producing phosphors supported on the sides thereof adjacent said wall, electron reflecting means positioned between said electrode and said end wall, said electron reflecting means being maintained at a potential negative with respect to said electrode, means for directing a beam of electrons upon said electrode to pass through the perforations thereof, means for rotating said electrons before reaching said electrode to control their angle of incidence with respect to said electrode, said electron rotating means being synchronized with the color components of a received color television signal to control the phosphors excited by said electron beam after reversal by said reflecting means in accordance with a received color television signal.

References Cited in the file of this patent

UNITED STATES PATENTS

| | | |
|---|---|---|
| 2,125,599 | Batchelor | Aug. 2, 1938 |
| 2,264,709 | Nicoll | Dec. 2, 1941 |
| 2,343,825 | Wilson | Mar. 7, 1944 |
| 2,446,249 | Schroeder | Aug. 3, 1948 |
| 2,461,515 | Bronwell | Feb. 15, 1949 |
| 2,577,038 | Rose | Dec. 4, 1951 |

FOREIGN PATENTS

| | | |
|---|---|---|
| 866,065 | France | Mar. 31, 1941 |